United States Patent
Haight

(10) Patent No.: US 10,627,022 B2
(45) Date of Patent: Apr. 21, 2020

(54) GIMBAL HOSE

(71) Applicant: WEIR CANADA, INC., Mississauga (CA)

(72) Inventor: Richard Haight, Mississauga (CA)

(73) Assignee: WEIR CANADA, INC., Mississauga (CA)

( * ) Notice: Subject to any disclaimer, the term of this patent is extended or adjusted under 35 U.S.C. 154(b) by 0 days.

(21) Appl. No.: 16/062,920

(22) PCT Filed: Dec. 8, 2016

(86) PCT No.: PCT/IB2016/057450
§ 371 (c)(1),
(2) Date: Jun. 15, 2018

(87) PCT Pub. No.: WO2017/103746
PCT Pub. Date: Jun. 22, 2017

(65) Prior Publication Data
US 2019/0024826 A1    Jan. 24, 2019

Related U.S. Application Data

(60) Provisional application No. 62/269,335, filed on Dec. 18, 2015.

(51) Int. Cl.
*F16L 11/08* (2006.01)
*B32B 1/08* (2006.01)
(Continued)

(52) U.S. Cl.
CPC .............. *F16L 11/087* (2013.01); *B32B 1/08* (2013.01); *B32B 3/06* (2013.01); *B32B 3/085* (2013.01); *B32B 3/18* (2013.01); *B32B 3/20* (2013.01); *B32B 3/263* (2013.01); *B32B 5/02* (2013.01); *B32B 5/024* (2013.01); *B32B 5/12* (2013.01); *B32B 5/26* (2013.01); *B32B 7/05* (2019.01); *B32B 15/02* (2013.01); *B32B 15/043* (2013.01); *B32B 15/06* (2013.01); *B32B 15/08* (2013.01);
(Continued)

(58) Field of Classification Search
CPC ........ F16L 11/11; F16L 11/112; F16L 11/082; F16L 11/088; F16L 11/085–088
USPC .................. 138/121–126, 172, 173
See application file for complete search history.

(56) References Cited

U.S. PATENT DOCUMENTS 3,047,026 A * 7/1962 Kahn ...................... F16L 11/112
                                                              138/121
4,308,896 A * 1/1982 Davis .................... F16L 11/045
                                                              138/125
(Continued)

FOREIGN PATENT DOCUMENTS

EP    2396270 A1    12/2011
GB    611998       11/1948

OTHER PUBLICATIONS

International Search Report dated Feb. 22, 2017 for PCT International Application No. PCT/IB2016/057450.
(Continued)

*Primary Examiner* — Patrick F Brinson
(74) *Attorney, Agent, or Firm* — Perry + Currier

(57) ABSTRACT

A hose is provided, including: a liner having a channel extending between opposing open ends; a reinforcing member surrounding the liner; and a plurality of spaced apart wrapped stiffening members surrounding the reinforcing member.

16 Claims, 6 Drawing Sheets

(51) Int. Cl.

| | | |
|---|---|---|
| *F16L 11/10* | (2006.01) | |
| *F16L 11/12* | (2006.01) | |
| *E21B 1/00* | (2006.01) | |
| *B32B 5/12* | (2006.01) | |
| *B32B 15/09* | (2006.01) | |
| *B32B 27/06* | (2006.01) | |
| *B32B 15/02* | (2006.01) | |
| *B32B 15/04* | (2006.01) | |
| *B32B 25/10* | (2006.01) | |
| *B32B 25/04* | (2006.01) | |
| *B32B 27/12* | (2006.01) | |
| *B32B 5/26* | (2006.01) | |
| *B32B 15/08* | (2006.01) | |
| *B32B 3/06* | (2006.01) | |
| *B32B 27/08* | (2006.01) | |
| *B32B 15/06* | (2006.01) | |
| *B32B 15/092* | (2006.01) | |
| *B32B 25/16* | (2006.01) | |
| *B32B 27/38* | (2006.01) | |
| *B32B 15/20* | (2006.01) | |
| *B32B 25/08* | (2006.01) | |
| *B32B 5/02* | (2006.01) | |
| *B32B 15/14* | (2006.01) | |
| *B32B 3/20* | (2006.01) | |
| *B32B 7/05* | (2019.01) | |
| *B32B 15/18* | (2006.01) | |
| *B32B 27/36* | (2006.01) | |
| *B32B 3/08* | (2006.01) | |
| *B32B 3/26* | (2006.01) | |
| *B32B 25/14* | (2006.01) | |
| *B32B 3/18* | (2006.01) | |

(52) U.S. Cl.
CPC ............ *B32B 15/09* (2013.01); *B32B 15/092* (2013.01); *B32B 15/14* (2013.01); *B32B 15/18* (2013.01); *B32B 15/20* (2013.01); *B32B 25/04* (2013.01); *B32B 25/08* (2013.01); *B32B 25/10* (2013.01); *B32B 25/14* (2013.01); *B32B 25/16* (2013.01); *B32B 27/06* (2013.01); *B32B 27/08* (2013.01); *B32B 27/12* (2013.01); *B32B 27/36* (2013.01); *B32B 27/38* (2013.01); *E21B 1/00* (2013.01); *F16L 11/10* (2013.01); *F16L 11/122* (2013.01); *B32B 2250/44* (2013.01); *B32B 2262/0269* (2013.01); *B32B 2262/0276* (2013.01); *B32B 2262/106* (2013.01); *B32B 2307/546* (2013.01); *B32B 2307/554* (2013.01); *B32B 2307/71* (2013.01); *B32B 2307/732* (2013.01); *B32B 2597/00* (2013.01); *F16L 11/085* (2013.01)

(56) References Cited

U.S. PATENT DOCUMENTS

| | | | | |
|---|---|---|---|---|
| 5,195,675 | A * | 3/1993 | Ouden | B21C 37/06 138/172 |
| 5,390,704 | A * | 2/1995 | Kanao | F16L 9/12 138/121 |
| 5,485,870 | A * | 1/1996 | Kraik | B21F 17/00 138/121 |
| 6,563,045 | B2 * | 5/2003 | Goett | H02G 3/0468 174/122 R |
| 6,827,109 | B2 * | 12/2004 | McCaughtry | F16L 11/112 138/122 |
| 7,004,201 | B2 * | 2/2006 | Arima | B29D 23/001 138/121 |
| 7,431,054 | B2 * | 10/2008 | Kramer, Jr. | B29C 53/305 138/109 |
| 8,752,591 | B2 * | 6/2014 | Montalvo | F16L 11/082 138/121 |
| 2003/0178083 | A1 * | 9/2003 | McCaughtry | F16L 11/112 138/133 |
| 2008/0017265 | A1 * | 1/2008 | Colbachini | F16L 11/112 138/122 |
| 2009/0133769 | A1 * | 5/2009 | Riley | B32B 1/08 138/122 |
| 2010/0071795 | A1 * | 3/2010 | Montalvo | F16L 11/085 138/126 |
| 2013/0180615 | A1 | 7/2013 | Ragner et al. | |
| 2013/0291989 | A1 | 11/2013 | Gray et al. | |
| 2015/0030295 | A1 | 1/2015 | Do | |

OTHER PUBLICATIONS

Written Opinion of the International Searching Authority for PCT International Patent Application No. PCT/IB2016/057450.
WIPO/IB, International Preliminary Report on Patentability, dated Jun. 19, 2018, re PCT International Patent Application No. PCT/IB2016/057450.
EPO, Extended European Search Report, dated Jul. 4, 2019, re European Patent Application No. 16874998.4.

* cited by examiner

GIMBAL HOSE

CROSS-REFERENCE TO RELATED APPLICATION

This application claims priority from U.S. Provisional Application No. 62/269,335, filed Dec. 18, 2015, the contents of which is incorporated herein by reference.

TECHNICAL FIELD

This disclosure relates in general to hoses for use in industrial operations and, in particular, to an improved gimbal hose for use in such operations.

BACKGROUND OF THE DISCLOSURE

Various industries, including the mining and oil and gas industries, make use of large-diameter hoses to carry fluids, for example in applications where rigid pipes would not be suitable. Such hoses, which can have diameters reaching several feet, generally include an inner liner made of a material such as rubber, a reinforcing layer, and an outer covering. The reinforcing layer is typically a fiber such as Kevlar® or polyester wrapped at an angle relative to the axis of the hose. The cover is typically a rubber with good environmental resistance, such as a styrene butadiene rubber (SBR) or neoprene.

The above-mentioned fibers provide strength to the hose against axial and outward radial forces (exerted by pressurized fluid in the hose). However, the resulting hose may be unable to effectively resist bending forces, or inward radial forces, such as those encountered when a vacuum is applied to the hose. The application of bending or vacuum to the hose can therefore cause the hose to kink or collapse. Conventional attempts to compensate for the above weaknesses include installing steel rings or wires around the fibers, sealing the rings or wires with rubber or other materials, and then applying the above-mentioned neoprene cover. Such efforts, however, significantly increase material and labor costs. The above-mentioned steel rings or wires can also result in hoses that are undesirably stiff, due to the significantly higher stiffness of steel relative to the fiber-based materials surrounding the liner.

SUMMARY

In a first aspect, there is provided a hose, including: a liner having a channel extending between opposing open ends; a reinforcing member surrounding the liner; and a plurality of spaced apart wrapped stiffening members surrounding the reinforcing member. The hose may reduce or prevent kinking or collapse under bending and vacuum conditions, with a reduced effect on manufacturing costs and hose flexibility.

In certain embodiments, the liner has a hollow cylindrical shape.

In certain embodiments, the liner includes a flexible material.

In certain embodiments, the reinforcing member includes at least one helical band of a reinforcing material.

In certain embodiments, the at least one helical band has an angle of between about forty-five degrees and about sixty degrees relative to a longitudinal axis of the channel.

In certain embodiments, the reinforcing member includes two helical bands of having opposing angles relative to the longitudinal axis.

In certain embodiments, the reinforcing material is a first fiber-based material.

In certain embodiments, each wrapped stiffening member includes an annular member wrapped about the reinforcing member.

In certain embodiments, the plurality of stiffening members are spaced apart along the longitudinal axis.

In certain embodiments, each stiffening member has an angle of about ninety degrees relative to the longitudinal axis.

In certain embodiments, each stiffening member includes a plurality of layers of a flexible stiffening material.

In certain embodiments, the reinforcing material is a second fiber-based material.

In certain embodiments, the second fiber-based material is the same material as the first fiber-based material.

In certain embodiments, the hose also includes a flange connected to each of the open ends.

In certain embodiments, the hose also includes a cover surrounding the stiffening members and the reinforcing member.

In certain embodiments, the cover includes a flexible sleeve.

In certain embodiments, the sleeve is a neoprene sleeve.

In certain embodiments, the sleeve is a styrene butadiene rubber (SBR) sleeve.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1:
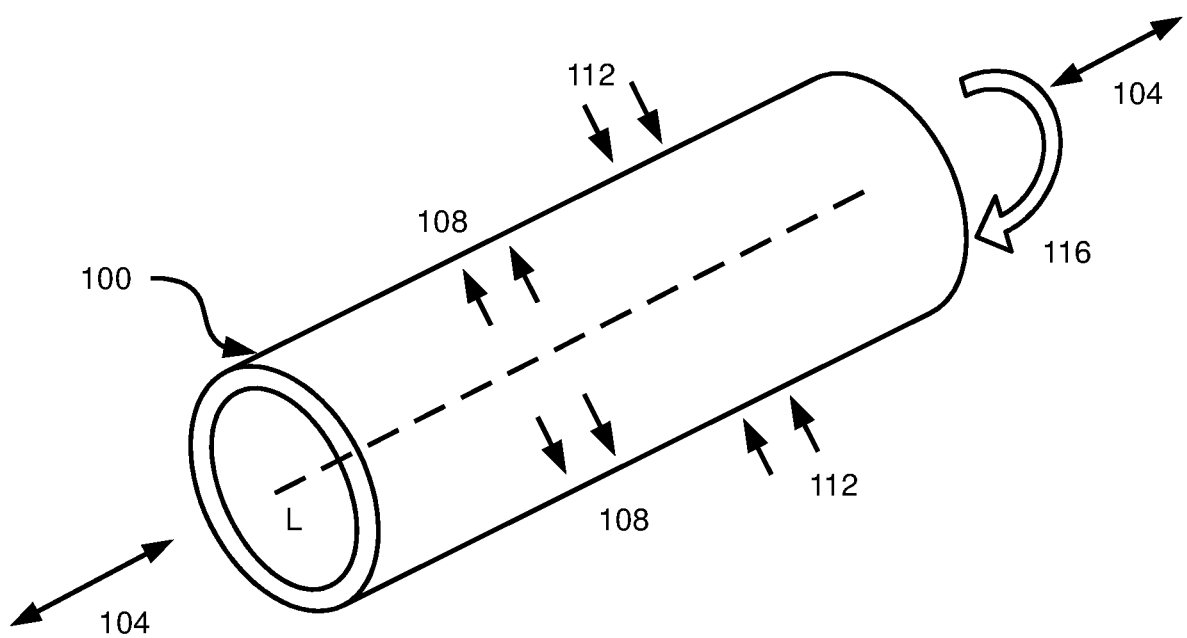
FIG. 1 is a schematic diagram of a hose in accordance with this disclosure.

FIG. 1 shows a schematic diagram of a hose 100 for carrying fluid. The nature of the fluid carried by the hose 100 is not particularly limited, and can include abrasive fluids such as slurry from mining or oil and gas operations. The hose 100 can be connected at either end to equipment such as pumps (not shown), storage facilities (e.g. tanks), piping, and the like. Such connections can be made via flanges that can be integral to the hose 100 or separate parts attached to the hose 100. The hose 100 can also be connected to another hose, forming a section of a longer hose for carrying fluid.

The hose 100 is also flexible, to accommodate movements of connected equipment, and to accommodate curvature in the desired path of fluid between equipment (for example, a pump outlet and a storage tank inlet between which the hose 100 will carry fluid may be disposed at ninety degree angles to one another). The degree of flexibility of the hose 100 is not particularly limited, but in general is greater than the flexibility of a similarly-dimensioned metal pipe (e.g. a steel pipe of a similar diameter and having similar pressure and flow capacities).

As illustrated in FIG. 1, the hose 100 may be subjected to various loads while in use. Axial loads 104 compress or stretch the hose 100 in a direction parallel to a longitudinal axis "L" of the hose 100 (such loads are generally coaxial with the longitudinal axis L). Outward radial loads 108 can be imposed by pressurized fluid within the hose 100. Further, inward radial loads 112 can be imposed by negative pressure within the hose 100 (e.g. due to pumps at either end of the hose 100 with asymmetric flow rates). Bending forces 116 can also be imposed on the hose 100, for example when the hose 100 is bent to accommodate the above-mentioned angling between equipment connected to the hose 100.

The above-mentioned loads can place conventional hoses in configurations that impede the ability of such conventional hoses to carry fluid. In addition, these loads can place the hoses in conditions that reduce the safety of nearby operators. For example, under vacuum, inward radial loads 112 can lead to the violent collapse of conventional hoses. Further, bending such conventional hoses can lead to kinking, partially or completely collapsing a portion of the hoses at the bend. As will be discussed in greater detail below, the hose 100 includes certain elements that may reduce the risk, severity, or both, of collapse and kinking. The elements of the hose 100 may also carry a reduced impact on manufacturing cost and flexibility in comparison with conventional structures that are employed to reduce the above risks.

Figure 2A:
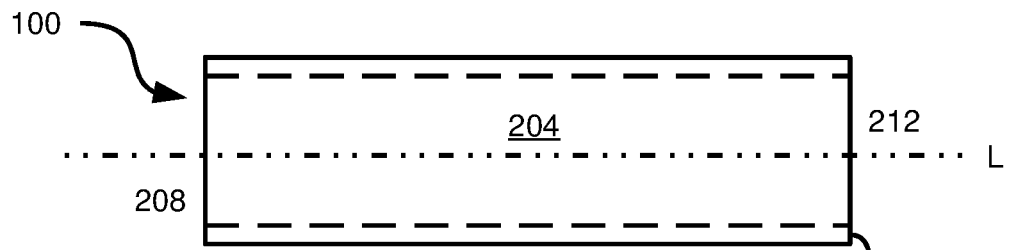
FIGS. 2A-2D are side views illustrating the assembly of the hose of FIG. 1 in accordance with this disclosure.
Figure 2B:
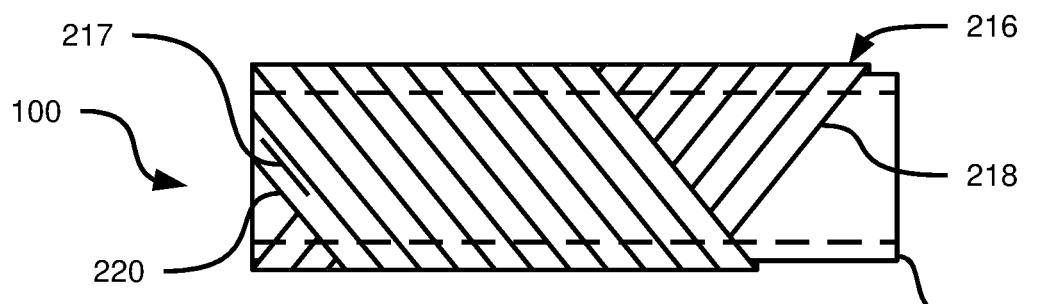

Turning now to FIGS. 2A-2D, example components of the hose 100 will be discussed. The hose 100 includes a liner 200 having a channel 204 extending between opposing open ends 208 and 212. The liner 200 can be, for example, a hollow cylinder (i.e. a tube). The liner 200 includes a flexible material, such as a rubber material. Surrounding the liner 200, as shown in FIG. 2B, is a reinforcing member 216. The reinforcing member 216 can include at least one helical band of a reinforcing material, such as a fiber-based material (e.g. a woven fiber such as Kevlar® or a fiber-reinforced composite material). When fiber-based materials are employed for the reinforcing member 216, the fibers are generally aligned in parallel with the angle of the helical band. An example fiber 217 is shown in FIG. 2B illustrating the alignment of fibers.

In the present example, the reinforcing member 216 includes two helical bands 218 and 220. As shown in FIG. 2B, each revolution of the helical bands 218 and 220 abuts the adjacent revolutions of that band; in other embodiments, adjacent revolutions may overlap, or may be spaced apart. Each of the bands 218 and 220 is inclined relative to the longitudinal axis L of the hose 100. The bands 218 and 220 are generally inclined in opposite directions; for example, in the illustrated embodiment the band 218 is inclined at about forty-five degrees from the longitudinal axis L, while the band 220 is inclined at about one hundred thirty-five degrees from the axis L, or about forty-five degrees below the axis L). In other embodiments, the bands 218 and 220 may be inclined at a variety of angles, for example at any angles between about thirty degrees (above or below the axis L) and about sixty degrees (above or below the axis L). In yet other embodiments, the bands 218 and 220 are inclined at a variety of angles, for example at any angle from about forty degrees (above or below the axis L) to about sixty degrees (above or below the axis L); from about fifty degrees (above or below the axis L) to about sixty degrees (above or below the axis L); or fifty-two degrees (above or below the axis L) to about 58 degrees (above or below the axis L). In some embodiments, the bands 218 and 220 are each inclined at an angle of about 54.4 degrees above and below the axis L, respectively.

Although the bands 218 and 220 are shown extending only partially along the length of the hose 100 in FIG. 2B, when the hose 100 is completely assembled, the bands 218 and 220 (or any other implementation of the reinforcing member 216) extend along the full length of the hose 100. The reinforcing member 216 preferably continuously covers the liner 200.

Figure 2C:
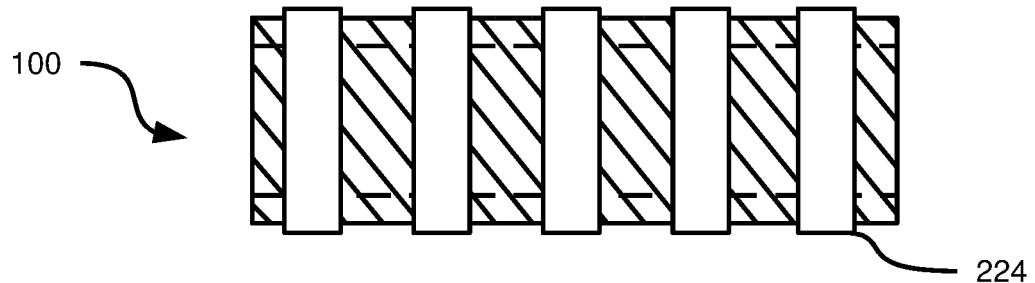

Referring now to FIG. 2C, the hose 100 also includes a plurality of distinct, spaced apart wrapped stiffening members 224 surrounding the reinforcing member 216. The number of stiffening members 224 and the spacing of the stiffening members 224 from each other are not particularly limited. In general, adjacent stiffening members 224 are spaced closely enough to each other along the length of the hose 100 to reduce or prevent kinking or collapsing of the hose 100 (in response to bending and vacuum conditions). In some embodiments, for a hose 100 with an outer diameter of about thirty inches, and the distance between the stiffening members 224 can be between eight and ten inches. In other embodiments, the distance between the stiffening members 224 can be below eight inches. In further embodiments, the distance between the stiffening members 224 can be greater than ten inches.

Each stiffening member 224 is an annular (i.e. ring-shaped) member wrapped about the reinforcing member 216. As seen in FIG. 2C, each stiffening member 224 is wrapped about the reinforcing member 216 at an angle of about ninety degrees relative to the axis L. The stiffening members 224 can be applied at angles greater or smaller than ninety degrees in other embodiments. In general, the angle of the stiffening members 224, relative to the axis L, is between about eighty degrees and about one hundred degrees. In other words, the stiffening members 224 are at greater angles relative to the axis L than the bands of the reinforcing member 216.

Each of the stiffening members 224 includes a flexible stiffening material that is suitable for application to the reinforcing member 216 by wrapping. The material can be, for example, a fiber-based material such as a polyester fiber, an aramid fiber such as Kevlar®, a carbon-fiber material, or the like. The material can also be a fiber-reinforced composite material, including a fiber material as mentioned above in combination with a polymer (e.g. epoxy, polyester or the like). In some embodiments, the material can include flexible strands or wires of metal, such as aluminum or steel. The material, or combination of materials, employed in the stiffening members 224, can have a similar flexibility (e.g. a similar stiffness) as the materials employed in the reinforcing member 216. In other words, the materials of the stiffening members 224 have a greater flexibility than steel, and are preferably closer in flexibility to the materials of the reinforcing member 216 than to steel. Indeed, in some embodiments the stiffening members 224 are made of the same material or combination of materials as the reinforcing member 216.

Each stiffening member 224 can include a plurality of layers of the above-mentioned material. The plurality of layers can be obtained, for example, by wrapping a piece of the material around the reinforcing member 216 until a desired thickness for the stiffening member 224 is reached.

In other embodiments, a plurality of pieces of material may be employed to construct each stiffening member 224. The thickness—provided, for example, by the above-mentioned plurality of layers of reinforcing material—can be selected based on a desired stiffness for the stiffening members 224. In general, a larger number of layers provides a stiffening member 224 with a greater stiffness. In some embodiments, the thickness of the stiffening members 224 is such that the stiffness of each stiffening member 224 is substantially equal to that of a steel ring. The spacing between the stiffening members 224 provides segments of the hose 100 (between stiffening members 224) that are permitted to flex, thus allowing the hose 100 as a whole to flex. In some embodiments, for a hose 100 having an outer diameter of about thirty inches, each stiffening member 224 can have a number of layers sufficient to reach a thickness of about two inches, and each stiffening member 224 can have a width (a dimension parallel to axis L) of about two inches. In other embodiments, each stiffening member 224 can have a thickness greater than two inches. In further embodiments, each stiffening member 224 can have a thickness smaller than two inches. Additionally, in some embodiments, each stiffening member 224 can have a width greater than two inches. In still further embodiments, each stiffening member 224 can have a width smaller than two inches.

Each stiffening member 224 can have any of a variety of shapes. In the example illustrated in FIG. 2C, each annular stiffening member 224 has a substantially rectangular cross section (taken in a plane parallel to the longitudinal axis L). In other embodiments, however, the cross-section of each stiffening member 224 can be square-shaped. In further embodiments, the cross-section of each stiffening member 224 can be triangular; that is, the cross section of the stiffening member 224 can taper from a base adjacent to the reinforcing member 216 outwards to a tip.

Figure 2D:
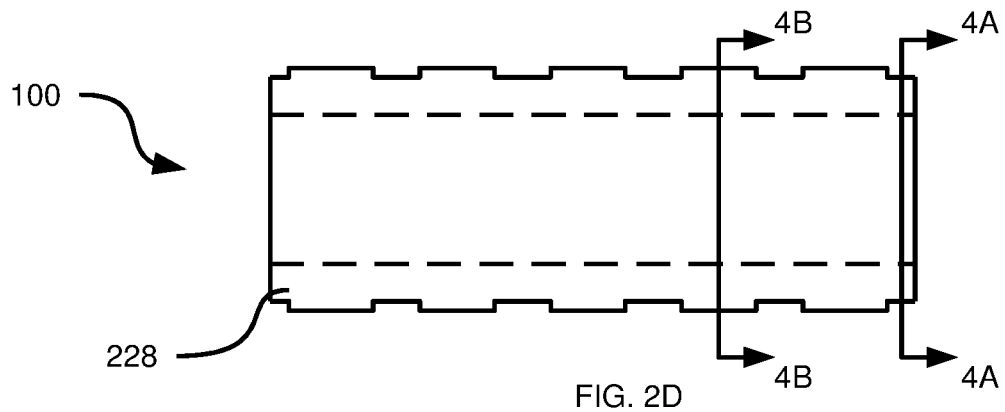

Referring now to FIG. 2D, following the application of the stiffening members 224 to the reinforcing member 216, a flexible sleeve 228 is placed over the stiffening members 224 and the reinforcing member 216. The sleeve 228 can include any of a wide variety of materials, and in the present example is a neoprene sleeve. In general, the sleeve protects the stiffening members 224 and the reinforcing member 216 from environmental conditions (e.g. wind, rain, abrasion from nearby equipment or the ground). In addition, as mentioned earlier, the hose 100 can include flanges (not shown) at the open ends 208 and 212, for connecting with equipment or other hoses.

Figure 3:
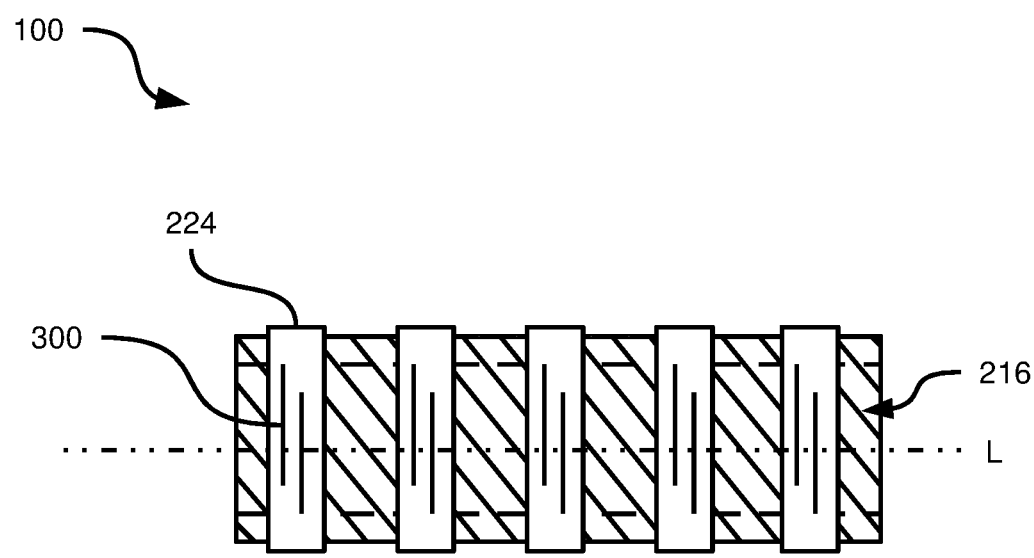
FIG. 3 is a side view illustrating the orientation of fibers in the reinforcing wrappings of the hose of FIG. 1 in accordance with this disclosure.

When fiber-based materials are employed in the stiffening members 224, the orientation of the fibers is preferably parallel to the angle of the stiffening member 224, as seen in FIG. 3. Specifically, in FIG. 3 example fibers 300 are shown, aligned with the angle of the stiffening members 224 relative to the axis L. In other words, the fibers are generally about perpendicular to the axis L.

Figure 4A:
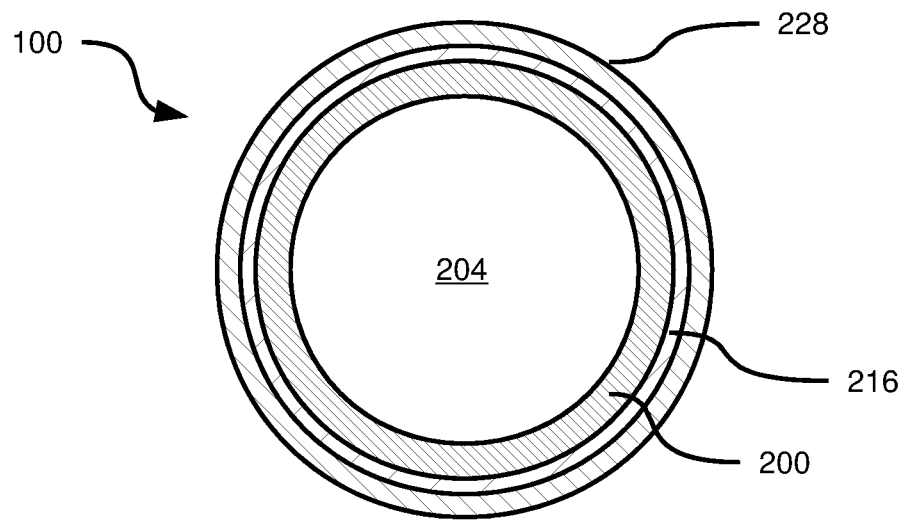
FIGS. 4A-4B are front cross sectional views of the assembled hose of FIG. 2D in accordance with this disclosure.
Figure 4B:
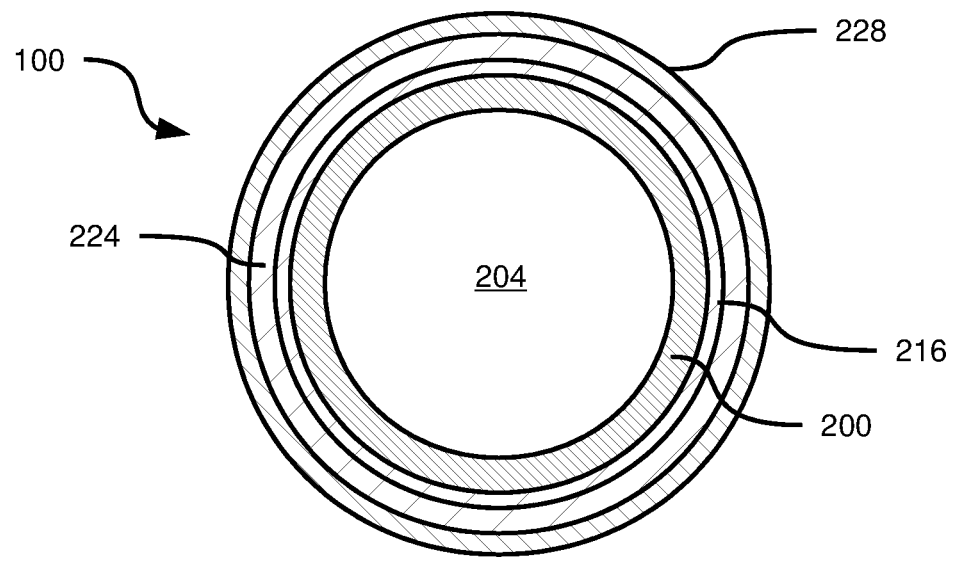

FIGS. 4A and 4B illustrate cross sections taken at the planes indicated in FIG. 2D. In particular, FIG. 4A shows a cross-section of the hose 100 in between adjacent stiffening members 224. Thus, in FIG. 4A only the liner 200, the reinforcing member 216 and the cover 228 are visible. FIG. 4B, in contrast, shows a cross section taken through a stiffening member 224, and thus the stiffening member 224 is also visible in FIG. 4B. Additionally, it can be seen in FIG. 4B that the overall wall thickness of the hose 100 is greater than in FIG. 4A. The cover 228 is shown in FIG. 2D as having a variable outer diameter (in the present example, having a corrugated or crenellated appearance), due to the presence or absence of the stiffening members 224 underneath the cover 228 at various points along the length of the hose 100. In other embodiments, the cover 228 can have a substantially constant outer diameter, due to the installation of a filler material such as rubber between the stiffening members 224.

Figure 5:
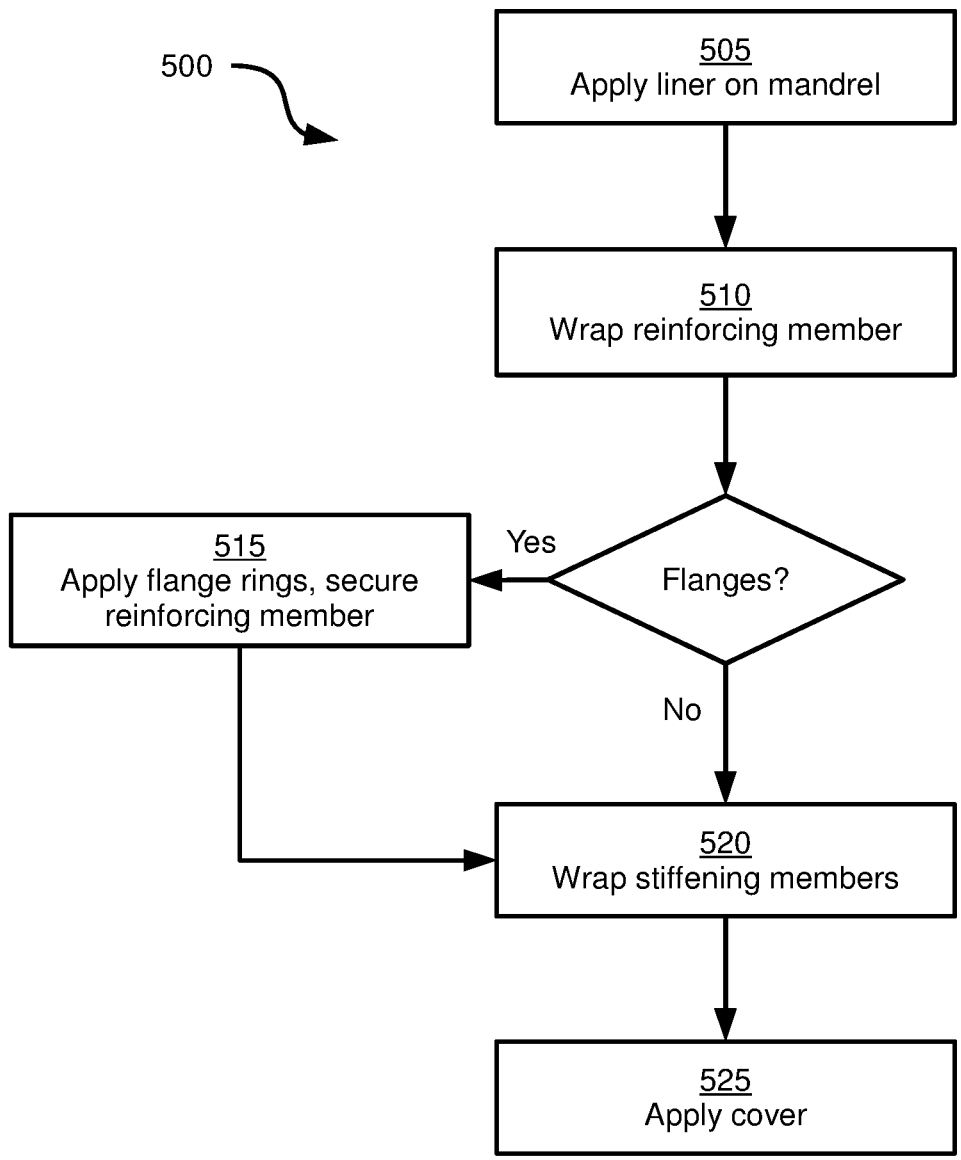
FIG. 5 is a flowchart illustrating a method of constructing the hose of FIG. 1 in accordance with this disclosure.
Figure 6:
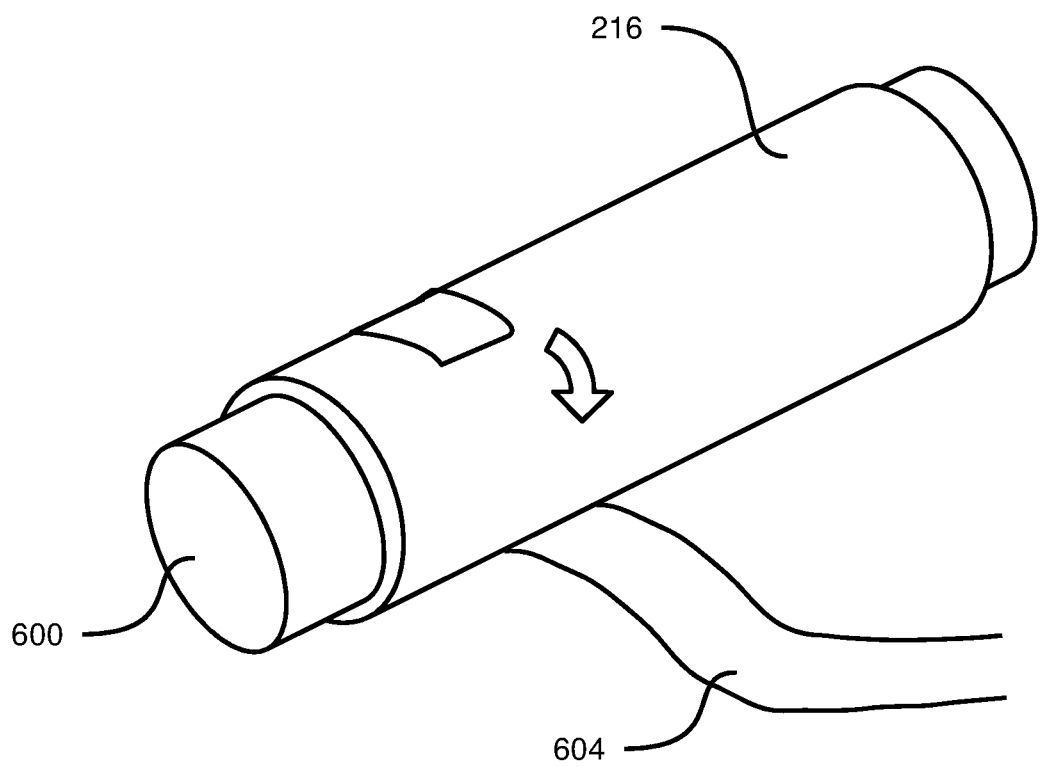
FIG. 6 is a schematic diagram of the installation of the reinforcing wrappings of the hose of FIG. 2C in accordance with this disclosure.

Turning now to FIG. 5, a method 500 of constructing the hose 100 will be discussed. At block 505, the liner 200 is mounted on a mandrel (a rotatable structure, generally having a similar external shape as the shape of the channel 204), such as the mandrel 600 shown in FIG. 6. When the liner 200 is mounted on the mandrel 600, the reinforcing member 216 is applied over the liner 200, for example by wrapping the helical bands 218 and 220 around the liner 200 (e.g. by rotating the mandrel 600 during application of the bands 218 and 220).

When flanges are being integrated with the open ends 208 and 212 of the hose 100, the performance of the method 500 proceeds to block 515, at which a flange ring is applied over the reinforcing member 216 adjacent to each of the open ends 208 and 212, and the reinforcing member 216 is secured to the flange rings (e.g. by wrapping the ends of the helical bands 218 and 220 around the flange rings and securing with plates and bolts or other fasteners).

The performance of the method 500 then proceeds to block 520, at which the stiffening members 224 are wrapped over the reinforcing member 216. For example, referring to FIG. 6, each stiffening member 224 can be constructed by wrapping a piece of flexible stiffening material 604 about the reinforcing member 216 (e.g. by rotating the mandrel 600). When the desired number of stiffening members 224 has been assembled, the cover 228 is applied at block 525. Separate stiffening members 224 can be wrapped simultaneously, from distinct pieces of flexible stiffening material. In other embodiments, the stiffening members 224 can be wrapped sequentially.

The above-described method, and in particular the performance of block 515, can be applied to construct hoses with built-in flanges. In other embodiments, nipple flanges may be employed rather than built-in flanges. In such embodiments, the performance of block 515 occurs before block 505. That is, when flanges are being applied (and the flanges are nipple flanges), the flanges are first mounted on the mandrel, and the liner 200 is then applied over the mandrel and the flanges. The performance of the method 500 then proceeds as described above in connection with blocks 520 and 525.

Various advantages of the embodiments described above will now occur to those skilled in the art. For example, the use of stiffening members 224 as described above rather than conventional steel rings may also reduce the likelihood of undesirably high increases in the stiffness of hose 100. The stiffening members 224 may have greater radial flexibility than conventional steel rings, and may therefore bear a smaller portion of the outward radial loads 108 shown in FIG. 1 than such steel rings, with the remainder of the outward radial loads 108 being accommodated by expansion of the liner 200 and reinforcing members 216. Due to the reduced outward radial loads imposed on the stiffening members 224, the stiffening members 224 may reduce the incidence of kinking or collapse of the hose 100, while increasing the stiffness of the hose 100 to a lesser degree than the conventional steel rings. As a further example advantage of the embodiments described herein, constructing the stiffening members 224 from spaced-apart, wrapped layers of reinforcing material, can reduce the cost and time required to manufacture the hose 100, in comparison to the conventional approach of embedding steel rings within the hose 100.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A hose, comprising:
    a liner having a channel extending between opposing open ends;
    a reinforcing member surrounding the liner; and
    a plurality of spaced apart wrapped stiffening members surrounding the reinforcing member,
    wherein the reinforcing member comprises at least one helical band of a reinforcing material, and wherein each wrapped stiffening member comprises an annular member wrapped about the reinforcing member.

2. The hose of claim 1, wherein the liner has a hollow cylindrical shape.

3. The hose of claim 1, wherein the liner comprises a flexible material.

4. The hose of claim 1, wherein the at least one helical band has an angle of between about forty-five degrees and about sixty degrees relative to a longitudinal axis of the channel.

5. The hose of claim 4, wherein the reinforcing member comprises two helical bands of having opposing angles relative to the longitudinal axis.

6. The hose of claim 1, wherein the reinforcing material is a fiber-based material.

7. The hose of claim 1, wherein the plurality of stiffening members are spaced apart along the longitudinal axis.

8. The hose of claim 1, wherein each stiffening member has an angle of about ninety degrees relative to the longitudinal axis.

9. The hose of claim 1, wherein each stiffening member comprises a plurality of layers of a flexible stiffening material.

10. The hose of claim 9, wherein the stiffening material is a fiber-based material.

11. The hose of claim 1, wherein the reinforcing material is a fiber-based material, and the stiffening member comprises a plurality of layers of a flexible fiber-based stiffening material, wherein the fiber-based material is the same material as the flexible fiber-based stiffening material.

12. The hose of claim 1, further comprising a flange connected to each of the open ends.

13. The hose of claim 1, further comprising a cover surrounding the stiffening members and the reinforcing member.

14. The hose of claim 13, the cover comprising a flexible sleeve.

15. The hose of claim 14, wherein the sleeve is a neoprene sleeve.

16. The hose of claim 14, wherein the sleeve is a styrene butadiene rubber (SBR) sleeve.

* * * * *